United States Patent [19]

Frick et al.

[11] Patent Number: 5,155,445
[45] Date of Patent: Oct. 13, 1992

[54] VERNIER VOLTAGE-TO-DIGITAL CONVERTER WITH A STORAGE CAPACITANCE SELECTABLE IN MAGNITUDE

[75] Inventors: Roger L. Frick, Chanhassen; John P. Schulte, Eden Prairie, both of Minn.

[73] Assignee: Rosemont, Inc., Eden Prairie, Minn.

[21] Appl. No.: 670,988

[22] Filed: Mar. 18, 1991

Related U.S. Application Data

[62] Division of Ser. No. 414,533, Sep. 29, 1989.

[51] Int. Cl.$^5$ ............................................. G01R 27/26
[52] U.S. Cl. .................................... 324/678; 324/711; 324/607; 324/679
[58] Field of Search ............... 324/607, 610, 706, 711, 324/721, 661, 662, 676, 678, 679, 680, 686; 73/718, 723, 724, 862.65, 862.67; 340/665, 668; 341/172

[56] References Cited

U.S. PATENT DOCUMENTS 4,437,164  3/1984  Branch, III .................. 364/571
4,791,352  12/1988  Frick et al. .................. 73/718 X

OTHER PUBLICATIONS

Micro Switch, a Division of Honeywell, "120PC Series-Excitation", *Application Notes, Note 3*, Sep. 1978, 1 sheet.
Micro Switch, a Division of Honeywell, "120PC Series-Null & Sensitivity Adjustment, Sensitivity Temperature Compensation", *Pressure Transducer Application Notes, Note 2, Revision 1*, Feb. 1979, pp. 1-5.

*Primary Examiner*—Jack B. Harvey
*Attorney, Agent, or Firm*—Kinney & Lange

[57] ABSTRACT

A voltage-to-digital converter comprising a storage circuit for providing a storage capacitance with a plurality of selectable magnitudes. The storage circuit provides a charge output representative of applied voltage input signals and the selected capacitive magnitude. A charge accumulation circuit is coupled to the charge output. The total charge accumulated is proportional to the integral of the amount of charge discharged from the storage circuit. The charge accumulation circuit provides a balance output representative of a comparison of the accumulated charge and a reference charge. A control circuit is coupled to the balance output for providing feedback signals as functions of the balance output for periodically charging and discharging the storage capacitance whereby a first sequence of charge packets is provided on the charge output for driving the accumulation of charge toward the reference within a first set of limits when a first capacitive magnitude is selected in the storage circuit and whereby a second sequence of charge packets is provided on the charge output for driving the accumulation of charge toward the reference charge within a second set of limits when a second capacitive magnitude is selected in the storage circuit. A calculation circuit is coupled to the feedback circuit for counting the number of charged packets generated in a measurement cycle. An output circuit provides an output indicative of the voltage input signals as a function of the number of packets counted.

5 Claims, 2 Drawing Sheets

VERNIER VOLTAGE-TO-DIGITAL CONVERTER WITH A STORAGE CAPACITANCE SELECTABLE IN MAGNITUDE

This is a division of application Ser. No. 07/414,533, filed Sept. 29, 1989, pending.

BACKGROUND OF THE INVENTION

1. Field of the Invention

This invention relates to a voltage-to-digital converter for providing a digital representation of a voltage input signal. In particular, this invention relates to a vernier adjustment that changes the resolution of the voltage-to-digital converters.

2. Description of the Prior Art

Voltage-to-digital converters are commonly used to convert a sensed parameter to a digital representation of the sensed parameter for immediate analysis or for transmission to a remote location. In control systems, a sensed parameter is measured and evaluated to determine appropriate control loop adjustments.

Typically, speed and accuracy are critical to effective operation of the control loop. Whenever speed and accuracy can be improved, the benefits are significant. Frick et al U.S. Pat. No. 4,791,352 entitled "Transmitter with Vernier Measurement" and co-pending application Ser. No. 07/175,627, filed Mar. 30, 1988 entitled "Measurement Circuit" provide significant improvements to the speed and resolution of parameter-to-digital converters by performing conversions with a plurality of charge packets which are accumulated in an integrator. The amount of charge in each packet is representative of a sensed parameter. The accumulated charge is compared to a reference level and the resulting output is used as a feedback signal to control the accumulation of charge packets in the integrator. The number of charge packets generated during a measurement cycle is representative of the sensed parameter. A digital representation of the sensed parameter is determined from the counted numbers.

Improved accuracy is accomplished in the Frick et al patent by adding a vernier adjustment to each measurement cycle. A vernier adjustment is an adjustment that changes the resolution of the voltage-to-digital converter. During a first part of the measurement cycle, a plurality of first charge packets are generated by a first excitation potential and provide a "coarse" adjustment of charge accumulated in the integrator. During a second part of the measurement cycle, a plurality of second charge packets are generated by a second excitation potential, smaller than the first. The amount of charge in each charge packet is varied with the excitation potential and therefore the plurality of second charge packets provide a "fine" adjustment of charge on the integrator. The fine adjustment provides a significantly more accurate digital result than the "coarse" adjustment.

The vernier arrangement of the Frick et al. patent provides an improved combination of speed and resolution, however, generating coarse and fine excitation potentials (using either resistive or capacitive voltage dividers, programmable gain operational amplifiers, or other voltage dividers) add considerable complexity and need for adjustments to the circuit. In order to provide convenient counting of charge packets, resistive voltage divider ratios must be adjusted to an integer number N and further match one another with the same number N in both dividers. There is thus a need to provide a vernier arrangement which has desirable speed and resolution features but does not require complex circuitry generating coarse and fine excitation potentials.

SUMMARY OF THE INVENTION

A transmitter senses a parameter, such as pressure, and provides an output representative of the sensed parameter. The transmitter includes a voltage-to-digital converter having a vernier adjustment to increase the speed and resolution of a conversion. The conversion includes one or more measurement cycles which generate digital outputs representative of voltage input signals. The voltage input signals are representative of the sensed parameter.

The voltage-to-digital converter comprises a storage circuit coupled to the voltage input signals for providing a storage capacitance with a plurality of selectable magnitudes. The voltage input signals are selectively applied to the storage capacitance for periodically charging and discharging the storage capacitance and for providing a charge output representative of the applied input voltage signals and the selected capacitive magnitude.

A charge accumulation circuit is coupled to the charge output for accumulating charge from the storage circuit. The total charge accumulated is proportional to the integral of the amount of charge discharged from the storage circuit. The charge accumulation circuit provides a balance output representative of a comparison of the accumulated charge and a reference charge.

A timing circuit is coupled to the balance output for providing feedback signals as functions of the balance output which control the charging and discharging of the storage capacitance to generate sequences of charge packets on the charge output. A first sequence of charge packets drive the accumulation of charge toward the reference charge within a first set of limits when a first capacitive magnitude is selected in the storage circuit. A second sequence of charge packets drives the accumulation of charge toward the reference charge within a second set of limits when a second capacitive magnitude is selected.

A calculation circuit is coupled to the timing circuit for counting numbers of charge packets generated in a measurement cycle. The calculation circuit provides digital outputs coupled to an output circuit which generates output signals indicative of the voltage input signals as a function of the counted numbers.

In one embodiment, a strain gauge transducer circuit includes first and second voltage-to-digital converters in accordance with the present invention described above. The transducer circuit also includes a resistive bridge and at least one precision resistor connected in series with the resistive bridge. The resistive bridge is responsive to pressure and temperature. The precision resistor, however, has a resistance which is less responsive to temperature than is the resistive bridge. The first voltage-to-digital converter provides an output representative of a voltage drop across the precision resistor and indicative of the temperature of the resistive bridge. The second voltage-to-digital converter provides an output representative of the pressure applied to and the temperature of the resistive bridge. A calculation circuit combines the output of the first voltage-to-digital converter with the output of the second voltage-to-digital converter to generate a digital representation of the applied pressure being corrected for temperature.

DETAILED DESCRIPTION OF THE PREFERRED EMBODIMENTS

Figure 1:
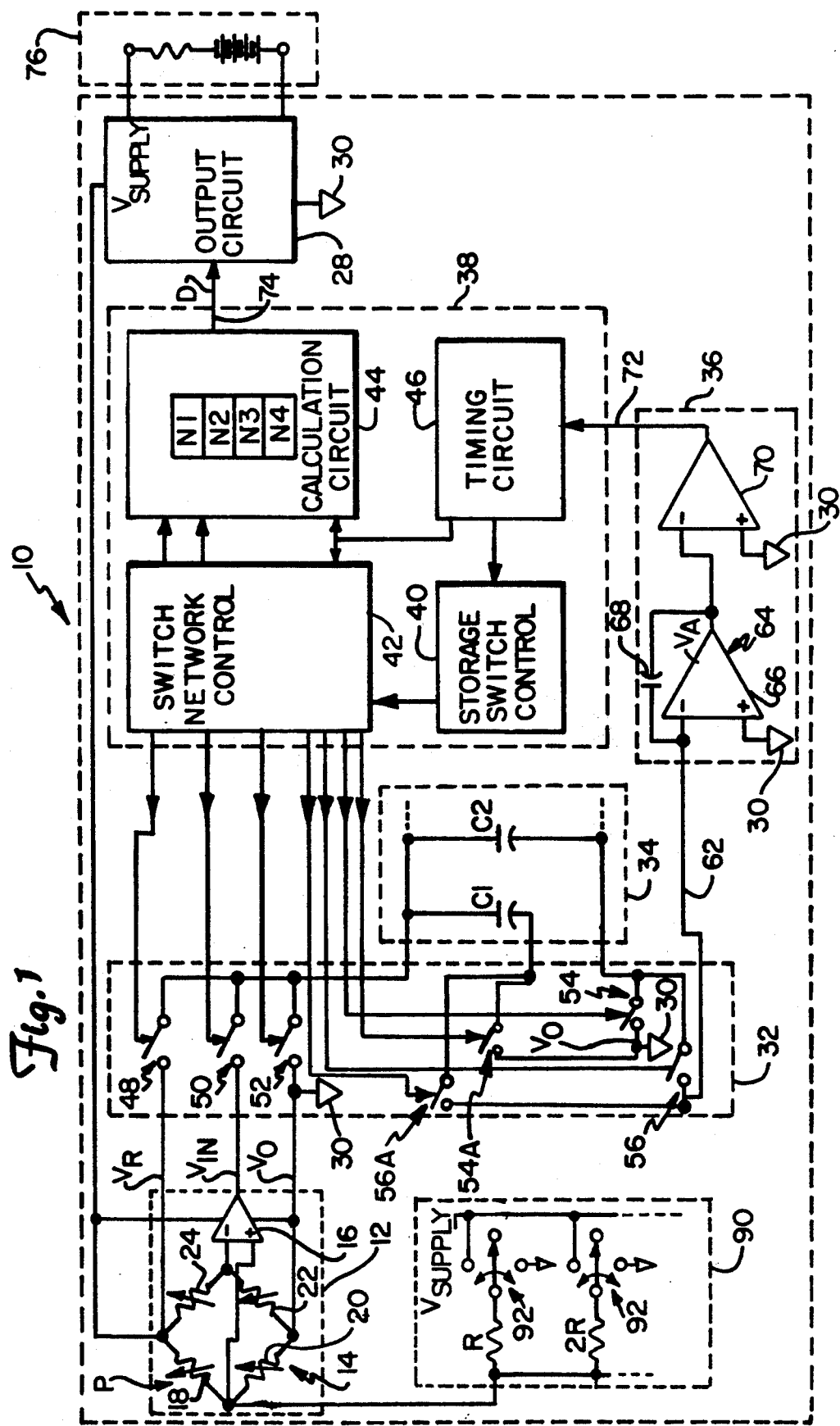
FIG. 1 is a diagram of a transmitter comprising a voltage-to-digital converter according to the present invention.

FIG. 1 illustrates a transmitter 10 which includes a voltage-to-digital converter in accordance with the present invention. The voltage-to-digital converter performs a series of successive measurement cycles to convert a parameter sensor output to a transmitter output which is representative of a sensed parameter.

In the embodiment shown in FIG. 1, transmitter 10 includes strain gauge circuit 12, which is responsive to an applied pressure P. Strain gauge circuit 12 includes resistor bridge 14 and preamplifier 16. Resistor bridge 14 includes resistors 18, 20, 22 and 24 having resistances which are sensitive to the applied pressure P. A junction between resistors 18 and 24 is connected to supply voltage $V_{supply}$ in output circuit 28. Resistor bridge 14 is electrically excited by $V_{supply}$ and is connected to system "ground" 30 at a junction between resistors 20 and 22. A sensor output voltage potential representative of the applied pressure P is coupled to preamplifier 16 at its inverting (−) and noninverting (+) inputs. The inverting (−) input is connected to a junction between resistors 22 and 24. The noninverting (+) input is connected to a junction between resistors 18 and 20. Preamplifier 16 provides strain gauge output signal $V_{IN}$ representative of the pressure P as a transmitter input. Transmitter input signal $V_R$ is connected to $V_{supply}$ which provides a reference voltage signal to transmitter 10. Transmitter input signal $V_0$ is connected to the junction between resistors 20 and 22 and to system ground 30. The voltage input signals $V_R$, $V_{IN}$, and $V_0$ connected as described above generate voltage potentials $V_1$ and $V_2$ which are representative of the pressure P applied to resistor bridge 14. Voltage potential $V_1$ is the difference between $V_R$ and $V_{IN}$. Voltage potential $V_2$ is the difference between $V_{IN}$ and $V_0$.

Transmitter 10 includes switch network 32, storage circuit 34, charge accumulation circuit 36, control circuit 38, and output circuit 28. Control circuit 38 includes storage switch control 40, switch network control 42, calculation circuit 44, and timing circuit 46. Timing circuit 46 controls the measurement cycles by controlling the operation of storage switch control 40, switch network control 42, and calculation circuit 44. Timing circuit 46 also closes a feedback loop between charge accumulation circuit 36 and switch controls 40 and 42. Calculation circuit 44 determines digital values D representative of the pressure P applied to resistor bridge 14.

Transmitter input voltages $V_R$, $V_{IN}$, and $V_0$ are coupled to switches 48, 50 and 52, respectively, in switch network 32. Switch network control 42 operates switches 48, 50 and 52 to selectively apply voltages $V_R$, $V_{IN}$, and $V_0$ to storage circuit 34. Switch network control 2 also operates switches 54, 54A and 56, 56A while applying the selected voltage inputs to storage circuit 4, and while connecting storage circuit 34 to ground 30.

Storage circuit 34 comprises a storage capacitance created by capacitors C1 and C2. Switches 4, 54A and 56, 56A enable the storage capacitance to have a selectable magnitude. Capacitor C1, having a smaller capacitive magnitude, is selected by switches 54A and 56A. Alternatively, a larger capacitive magnitude is selected by also closing switches 54 and 56 to create a parallel combination of capacitors C1 and C2. In one embodiment, capacitor C1 has a capacitive magnitude of C and capacitor C2 has a capacitive magnitude of $(2^N-1)C$, where C is a measure of capacitance and N is a preselected number which defines a ratio of C1 to C2. Therefore, a parallel combination of C1 and C2 has a capacitive magnitude of $2^N C$.

During a measurement cycle, switch network control 42 controls switches 48, 50, 52, 54, 54A and 56, 6A in switch network 32 for repetitively charging and discharging the storage capacitance in storage circuit 4. Switch network control 42 first closes selected switches in switch network 32 to connect the storage capacitance between system ground 30 and a selected one of the transmitter input voltages $V_0$, $V_{IN}$ or $V_R$. A selected charge is stored on the storage capacitance when the selected switches are opened. Next, switch network control 42 closes other selected switches in switch network 32 to discharge the storage capacitance and generate a charge packet on charge output 62 through switch 56. The term "packet" refers to a discrete amount of electrical charge which flows to or from a capacitance when it is charged from a first voltage potential to a second voltage potential, different from the first potential. The amount of the charge in a charge packet is a function of the storage capacitance, the voltage potential applied when the storage capacitance was charged, and the voltage potential applied when the storage capacitance is discharged.

In one embodiment, voltage potentials $V_1$ and $V_2$ are selectively applied to storage circuit 34 to charge the storage capacitance to either a first stored charge having a first polarity or a second storage charge having a second polarity, opposite the first polarity. Additive and subtractive charge packets are generated by discharging the first and second storage charges, respectively.

During a first part of the measurement cycle, control circuit 38 operates storage switch control 40 to control switch network control 42 to select the larger capacitive magnitude $2^N C$ by closing switches 54, 54A and 56, 56A in storage circuit 34. Switch network control 42 operates selected switches in switch network 32 to repetitively charge and discharge the storage capacitance for generating a first sequence of additive and subtractive charge packets on charge output 62. The number of individual additive and subtractive charge packets can vary, but the total number of charge packets $(N_1+N_2)$ in the first sequence is fixed to a preselected number, where:

$N_1$ = the count of charge packets providing a charge with magnitude $(2^N C\ V1)$ to integrator 64;

$N_2$ = the count of charge packets providing a charge with magnitude $(2^N V2)$ to integrator 64.

The individual numbers $N_1$ and $N_2$ of charge packets in the first sequence can correspond to either the additive or the subtractive charge packets depending upon the polarities of $V_1$ and $V_2$ as they are applied to the storage circuit.

Charge accumulation circuit 36 is coupled to charge output 62 and comprises integrator 64 which accumulates the additive and subtractive charge packets from charge output 62. Integrator 64 comprises amplifier 66 and capacitor 68. A noninverting (+) input of amplifier 66 is connected to system ground 30. An inverting (−) input of amplifier 66 is connected to charge output 62. Capacitor 68 is connected between the inverting input and an output of amplifier 66. Integrator 64 accumulates the charge packets generated on charge output 62 by performing a time integration of the current generated by the charge packets. Additive and subtractive charge packets add to and subtract from the charge accumulated. Output potential $V_A$ is generated by amplifier 66 and is representative of the amount of charge accumulated on integrator 64. Output $V_A$ is coupled to an inverting (−) input of comparator 70. A noninverting (+) input of comparator 70 is connected to system ground 30 and represents a reference. Comparator 70 provides a balance output 72 indicative of a comparison between the accumulated charge and a reference charge.

Timing circuit 46 monitors balance output 72, determines whether the accumulated charge is above or below the reference charge, and then operates switch network control 42 to selectively generate additive and subtractive charge packets to direct the accumulated charge toward the reference charge within a first set of limits. The first set of limits is determined during the first part of the measurement cycle by the selected larger storage capacitance $2^N C$ and the magnitude of the applied voltages $V_1$ and $V_2$.

The first set of limits define a coarse adjustment of the accumulated charge on integrator 64 with respect to the reference charge. The balance of charge on integrator 64 after the first part of the measurement cycle approaches a balance shown by Equation 1 below:

$$N_1 \, 2^N C \, V_1 = N_2 \, 2^N C \, V_2 \qquad \text{Equation 1}$$

During a second part of the measurement cycle, storage switch control 40 controls switch network control 42 to select the smaller capacitive magnitude C in storage circuit 34 by opening switches 54 and 56. Switch network control 42 then operates selected switches in switch network 32 to generate a second sequence of additive and subtractive charge packets. The total number of charge packets ($N_3+N_4$) in the second sequence is also fixed to a preselected number. Where:

$N_3$ = the count of charge packets providing a charge with magnitude ($CV_1$) to integrator 64;
$N_4$ = the count of charge packets providing a charge with magnitude ($CV_2$) to integrator 64.

Calculation circuit 44 maintains the count of individual charge packets $N_1$, $N_2$, $N_3$, and $N_4$ during the first and second parts of the measurement cycle.

The amount of charge in each charge packet is smaller in the second part of the measurement cycle than in the first since each packet in the second sequence is generated by discharging the smaller capacitive magnitude C rather than $2^N C$. Each charge packet in the second sequence is accumulated by integrator 64. Switch network control 42 selectively generates additive and subtractive charge packets for directing the accumulated charge on integrator 64 toward the reference charge within a second set of limits. The second set of limits are smaller than the first set of limits (which results in greater resolution) since the amount of charge in each charge packet is smaller in the second part of the measurement cycle than in the first. The smaller charge packets provide a fine adjustment of charge accumulated on integrator 64. The accumulated charge is balanced over the first and second parts of the measurement cycle approaching Equation 2:

$$(N_1 \, 2^N C \, V_1) + (N_2 \, 2^N C \, V_2) + (N_4 \, C \, V_2) \qquad \text{Equation 2}$$

The terms in Equation 2 can be rearranged to provide an expression for the ratio $V_1/V_2$:

$$\frac{V_1}{V_2} = \frac{N_2 \, 2^N + N_4}{N_1 \, 2^N + N_3} \qquad \text{Equation 3}$$

The transmitter input voltage $V_{IN}$ is substantially proportional to the sensed parameter and the reference voltage $V_R$. The quantity $(V_1-V_2)/(V_1+V_2)$ is thus representative of the sensed parameter but independent of the reference voltage $V_R$. Equation 3 is substituted into Equation 4 below to provide Equation 5 which expresses $(V_1-V_2)/(V_1+V_2)$ in terms of the ratio $2^N$ and the counts $N_1$, $N_2$, $N_3$, and $N_4$.

$$\frac{V_1 - V_2}{V_1 + V_2} = \frac{(V_1/V_2) - 1}{(V_1/V_2) + 1} \qquad \text{Equation 4}$$

$$\frac{V_1 - V_2}{V_1 + V_2} = \frac{2^N (N_2 - N_1) + (N_4 - N_3)}{2^N (N_2 + N_1) + (N_4 + N_3)} \qquad \text{Equation 5}$$

Under the control constraints fixing ($N_2+N_1$) and ($N_4+N_3$) to be preselected numbers, the denominator of the right-hand side of Equation 5 is a quantity fixed by the control circuit 38 and the ratio $2^N$ of the larger and smaller storage capacitances. This eliminates a need for division each time a measurement is updated. The left-hand side of Equation 5 can be rewritten in terms of transmitter input voltage $V_{IN}$ and reference voltage $V_R$ as shown in Equation 6:

$$\frac{V_1 - V_2}{V_1 + V_2} = 1 - \frac{2(V_{IN} - V_0)}{(V_R - V_0)} \qquad \text{Equation 6}$$

When $V_0=0$, Equations 5 and 6 can be combined to give Equation 7:

$$\frac{V_{IN}}{V_R} = \frac{1}{2} - \frac{2^N (N_2 - N_1) + (N_4 - N_3)}{2[2^N(N_2 + N_1) + (N_4 + N_3)]} \qquad \text{Equation 7}$$

The left-hand side of Equation 7 is proportional to the input voltage $V_{IN}$ and the right-hand side of Equation 7 is a function of the numbers of charge packets counted during a measurement cycle. The arrangement thus performs a conversion from an input voltage to a digital number representing the input voltage. The input voltage $V_{IN}$ is proportional to $V_R$ since $V_R$ is the potential which energizes resistor bridge 14. The ratio $V_{IN}/V_R$ is thus independent of $V_R$.

In Equation 7 above, all of the quantities on the right-hand side of the equation are whole numbers or integers, thus simplifying digital calculation. The calculation of the right-hand side of Equation 7 can be further simplified in a further preferred embodiment to eliminate the need for subtraction each time the output is updated. The numbers N and ($N_1+N_2$)=K1 and $(N_3+N_4)=K2$ in the denominator of Equation 7 can be all predetermined or fixed by the design, and therefore the denominator itself becomes a constant fixed by design. Substituting constants K1 and K2 into Equation 7 and simplifying provides Equation 8:

$$\frac{V_{IN}}{V_R} = \frac{2^N N_1 + N_3}{2^N K1 + K2} \qquad \text{Equation 8}$$

In Equation 8, the denominator is fixed and the only variables in the equation are N1 and N3. The denominator thus becomes a scaling factor, and the calculation of the output can be performed using only two variables $N_1$ and $N_3$. Alternatively, Equation 7 can be manipulated to result in an equation that depends on only variables $N_2$ and $N_4$. Computation in calculation circuit 44 is thus simplified.

Through Equations 7 and 8, calculation circuit 44 can determine digital values D from the counted numbers of charge packets. The digital values D are representative of the pressure P applied to resistor bridge 14. Each subsequent measurement cycle updates digital values D and calculation circuit 44 applies them to output 74. Output circuit 28 is coupled to output 74 and converts each value D to an analog quantity such as current for transmission to a remote location through transmission loop 76. Transmission loop 76 can be a two-wire 4–20 milliamp transmission loop. Control circuit 38 generates each updated value D at a constant rate because of the constraints on the total number of charge packets that are generated during each part of the measurement cycle. Charge packets are provided at fixed repetition rate. This simplifies the digital-to-analog conversion performed by output circuit 28 since updates arrive at a predictable time.

Calculation circuit 44 controls storage of the final counts $N_1$, $N_2$, $N_3$, and $N_4$ of the individual additive and subtractive charge packets during each part of the measurement cycle and controls calculation of the digital values D at the end of each measurement cycle.

Any charge imbalance still remaining on integrator 64 after coarse and fine adjustment is carried over to the next measurement cycle. Errors in the sequence of digital values D tend to average to zero or cancel over time. The transmitter output on loop 76, integrated over time, is thus substantially free of errors due to charge remaining on integrator 64 at the end of each measurement cycle. The use of the smaller and larger capacitive magnitudes provide vernier adjustment with a desired combination of increased speed and resolution.

In an alternative embodiment (not shown), storage circuit 34 comprises more than two capacitors to provide a storage capacitance having a greater number of selectable magnitudes. The measurement cycle is divided accordingly to provide additional resolution levels beyond the "coarse" and "fine" adjustments described above. At each resolution level, additional charge packets are generated to balance the accumulated charge with respect to the reference charge. The numbers of additional charge packets generated are counted and are added as new terms in Equation 2. Calculation circuit 44 is adjusted to accommodate the additional counted numbers and to thereby increase the accuracy of the digital values D.

A bias circuit 90 can be provided to zero or null the output of bridge 14 at the time of manufacture. The bias circuit 90 can comprise a R−2R ladder connected to tristate switches 92 as shown, or other bias circuitry such as various digital-to-analog converters may be used. At the time of manufacture, switches 92 are adjusted while observing the electrical output of bridge 14 until the output of bridge 14 is adjusted to a desired level.

Figure 2:
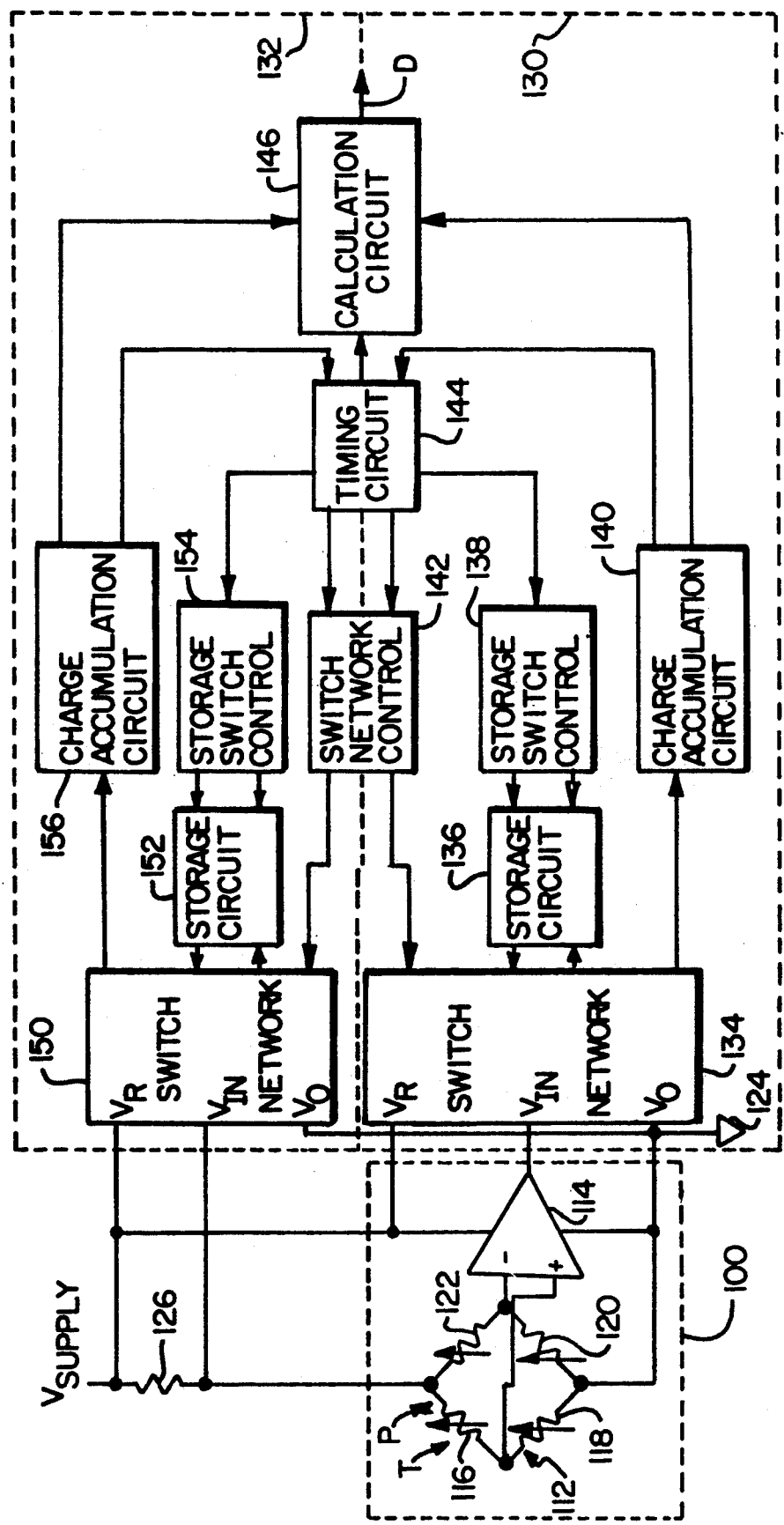
FIG. 2 is a diagram of a strain gauge pressure sensor and a sensor processor comprising first and second voltage-to-digital converters in accordance with the present invention.

FIG. 2 illustrates a sensor processor having two voltage-to-digital converters in accordance with the present invention as described above. The two converters simultaneously convert voltages to digital values representative of the pressure and the temperature applied to a strain gauge. The converters are combined to generate digital representation of the pressure connected for temperature, and the temperature corrected for pressure.

Strain gauge circuit 110 includes resistor bridge 112 and preamplifier 114. Resistor bridge 112 includes resistors 116, 118, 120, and 122. Preamplifier 114 includes an inverting (−) and a non-inverting (+) input which are coupled to resistor bridge 112 at junctions between resistors 116 and 118 and between resistors 120 and 122, respectively. Preamplifier 114 is also coupled between supply voltage $V_{supply}$ and system ground 124. Resistor bridge 112 is connected to system ground 124, at a junction between resistors 118 and 120. Precision resistor 126 is connected between supply voltage $V_{supply}$ resistor bridge 112 at a junction between resistors 116 and 122.

Sensor processor 100 comprises first and second voltage-to-digital converters 130 and 132 which are combined to share common circuitry. The first and second voltage-to-digital converters 130 and 132 are each in accordance with the present invention as described above. The first voltage-to-digital converter 130 comprises switch network 134, storage circuit 136, storage switch control 138, charge accumulation circuit 140, switch network control 142, timing circuit 144, and calculation circuit 146. Switch network 134 comprises voltage inputs $V_R$, $V_{IN}$, and $V_0$. Voltage input $V_R$ is coupled to the supply voltage $V_{supply}$ for providing a reference voltage indicative of the voltage potential applied to bridge 112. Voltage input $V_0$ is connected to system ground 124. An output of preamplifier 114 is coupled to voltage input $V_{IN}$ to provide voltage input signals representative of the pressure P and temperature T applied to resistor bridge 112. Switch network control 142 operates switch network 134 to selectively apply input voltages $V_R$, $V_{IN}$, and $V_0$ to storage circuit 136 while the first voltage-to-digital converter performs measurement cycles to obtain digital values representative of the pressure P and temperature T applied to resistor bridge 112.

The resistances of resistor bridge 112 are temperature sensitive, which causes its voltage output to vary undesirably with temperature. To overcome this problem, bridge 112 is electrically excited by supply voltage $V_{supply}$ through precision resistor 126 which is relatively insensitive to temperature with respect to bridge 112. Voltage potential $V_4$, across resistor 126, is thereby a function of the temperature T of resistor bridge 112. Voltage potential $V_4$ is applied to switch network 150 of the second voltage-to-digital converter 132 across voltage inputs $V_R$ and $V_{IN}$. Voltage input $V_0$ of switch network 150 is connected to system ground 124. The second voltage-to-digital converter 132 comprises switch network 150, storage circuit 152, storage switch control 154, charge accumulation circuit 156, switch network control 142, timing circuit 144, and calculation circuit 146. The voltage potential $V_4$ is converted by the second voltage-to-digital converter 132 to a digital representation indicative of the temperature T applied to resistor bridge 112 of strain gauge circuit 110.

The first and second voltage-to-digital converters 130 and 132 share switch network control 142, timing circuit 144, and calculation circuit 146. This reduces the amount of circuitry comprising sensor processor 100. Since timing circuit 144 is common to the first and second voltage-to-digital converters 130 and 132, the operation of both converters is preferably synchronized so that the two converters start and complete measurement cycles at the same time. The digital representations of the pressure P and the temperature T are thereby time correlated to one another, allowing a simple calculation by calculation circuit 146 of a digital representation of the pressure P applied to strain gauge circuit 112 corrected for temperature T using only the most recent values of obtained for pressure P and temperature T.

Sensor processor 100, strain gauge circuit 112, and precision resistor 126 can be included in a transmitter where substantially all of the capacitance to digital conversion circuitry is included in a single complementary-metal-oxide-semiconductor (CMOS) application specific integrated circuit (ASIC). This provides a preferred compact, low power transmitter.

Although the present invention has been described with reference to preferred embodiments, workers skilled in the art will recognize that changes may be made in form and detail without departing from the spirit and scope of the invention.

What is claimed is:

1. A measurement circuit for providing a measurement output as a function of a sensed parameter, the circuit comprising:
    means for providing a storage capacitance having a capacitive magnitude which varies as a function of a control signal;
    means for forming a plurality of charge packets having a first polarity and a plurality of charge packets having a second polarity opposite the first polarity, each of such packets comprising a quantity of charge, the quantity of charge in at least some of the packets being a function of the sensed parameter and the capacitive magnitude;
    means for receiving the charge packets and providing an integrator output representative of an accumulated quantity of charge;
    means for controlling numbers of charge packets formed as a function of the integrator output such that the accumulated quantity of charge tends to be balanced;
    means for providing the control signal to vary the capacitive magnitude and thereby vary sensitivity of the circuit to the sensed parameter; and
    means for providing an output representative of the second parameter as a function of numbers of charge packets formed.

2. A method of providing an output signal which is a function of a sensed parameter, the method comprising:
    during each of a plurality of measurement cycles:
        forming first charge packets of first polarity, having a charge which is a function of the sensed parameter and a first capacitive magnitude;
        forming second charge packets of second polarity, opposite the first polarity having a charge which is a function of the sensed parameter and the first capacitive magnitude;
        selectively transferring the first and second charge packets to a charge accumulator for directing accumulating charge toward a reference charge;
        forming third charge packets of first polarity having a charge which is a function of the sensed parameter and a second, different capacitive magnitude;
        forming fourth charge packets of second polarity having a charge which is a function of the sensed parameter and the second capacitive magnitude; and
        selectively transferring the third and fourth charge packets to the charge accumulator for directing accumulating charge toward the reference charge;
    counting numbers of at least first and third charge packets which are transferred to the charge accumulator during a plurality of measurement cycles; and
    providing the output signal based on the counted numbers.

3. A voltage-to-digital converter for providing a digital representation of voltage input signals, the converter comprising:
    a storage circuit coupled to the voltage input signals for providing a storage capacitance with a plurality of selectable magnitudes and for providing a charge output representative of applied voltage input signals and the selected capacitive magnitude;
    charge accumulation means coupled to the charge output for accumulating charge from the storage circuit whereby the total charge accumulated is proportional to the integral of the amount of charge discharged from the storage circuit, the charge accumulation means also providing a balance output representative of a comparison of the accumulated charge and a reference charge;
    feedback means coupled to the balance output for providing feedback signals as functions of the balance output for periodically charging and discharging the storage capacitance whereby a first sequence of charge packets is provided on the charge output for driving the accumulation of charge toward the reference charge within a first set of limits when a first capacitive magnitude is selected in the storage circuit and whereby a second sequence of charge packets is provided on the charge output for driving the accumulation of charge toward the reference charge within a second set of limits when a second capacitive magnitude is selected in the storage circuit;
    counting means coupled to the feedback means for counting numbers of charged packets generated in a measurement cycle; and
    output means for providing an output indicative of the voltage input signals as a function of the counted numbers.

4. The voltage-to-digital converter of claim 3 wherein the storage circuit comprises a plurality of capacitors selectively connected through the switch means.

5. The voltage-to-digital converter of claim 4 wherein the feedback means comprises switch control means for controlling the switch means.

* * * * *

UNITED STATES PATENT AND TRADEMARK OFFICE
CERTIFICATE OF CORRECTION

PATENT NO.   : 5,155,445
DATED        : October 13, 1992
INVENTOR(S)  : ROGER L. FRICK, JOHN P. SCHULTE It is certified that error appears in the above-identified patent and that said Letters Patent is hereby corrected as shown below:

Col. 3, lines 67-68, delete "control 2, insert "control 42"

Col. 4, line 1, delete "circuit 4", insert "circuit 34"

Col. 4, line 4, delete "Switches 4", insert "Switches 54"

Col. 4, line 20, delete "circuit 4", insert "circuit 34"

Col. 8, line 12, delete "connected", insert "corrected"

Col. 9, line 58, delete "second", insert "sensed"

Signed and Sealed this

Twenty-first Day of December, 1993

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,155,445
DATED : October 13, 1992
INVENTOR(S) : Roger L. Frick and John P. Schulte It is certified that error appears in the above-indentified patent and that said Letters Patent is hereby corrected as shown below:

Col. 6, delete $(N_1 \ 2^N \ C \ V_1)+(N_2 2^N \ C \ V_2)+(N_4 \ C \ V_2)$ Equation 2 insert $(N_1 \ 2^N \ C \ V_1)+(N_3 \ C \ V_1)=(N_2 \ 2^N \ C \ V_2) + (N_4 \ C \ \dot{V}_2)$ Equation 2

Signed and Sealed this

Twelfth Day of July, 1994

Attest:

BRUCE LEHMAN

Attesting Officer          Commissioner of Patents and Trademarks